March 14, 1950  M. T. CARPENTER  2,500,516
HYDROCARBON SYNTHESIS
Filed Dec. 21, 1944  2 Sheets-Sheet 2
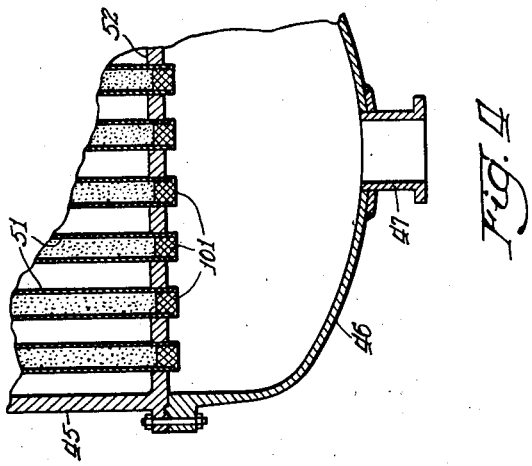
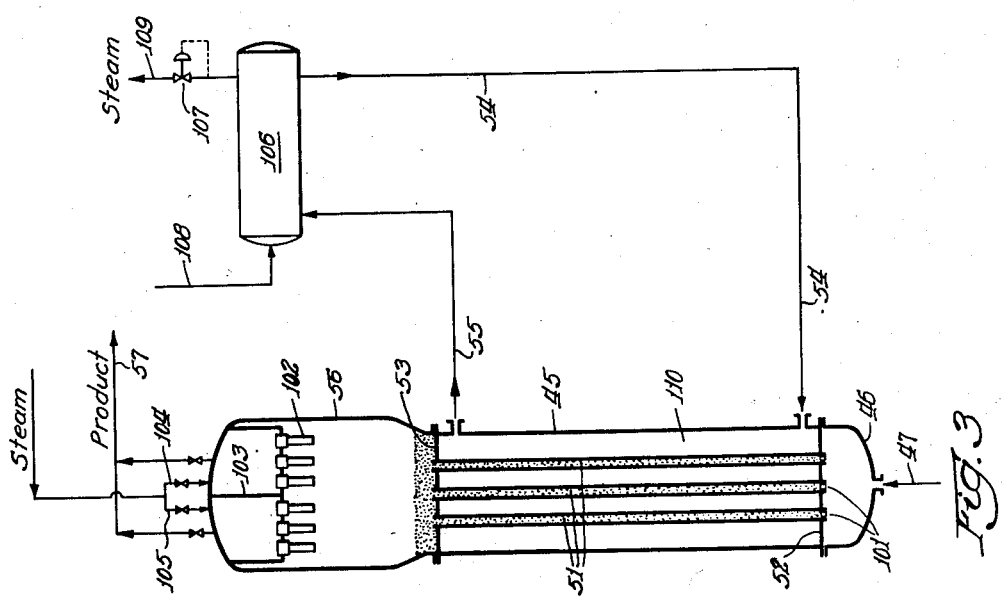
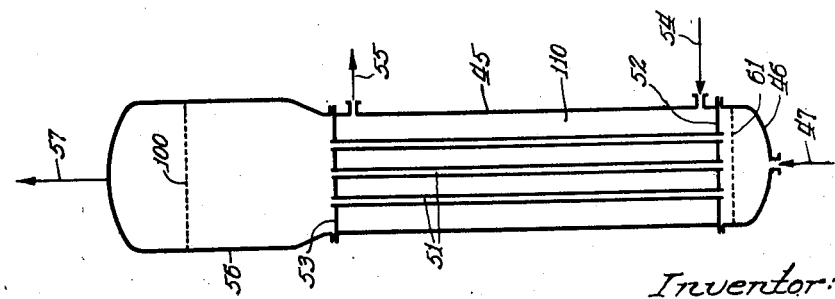
Inventor:
Morris T. Carpenter
By: Everett A. Johnson
Atty Patented Mar. 14, 1950

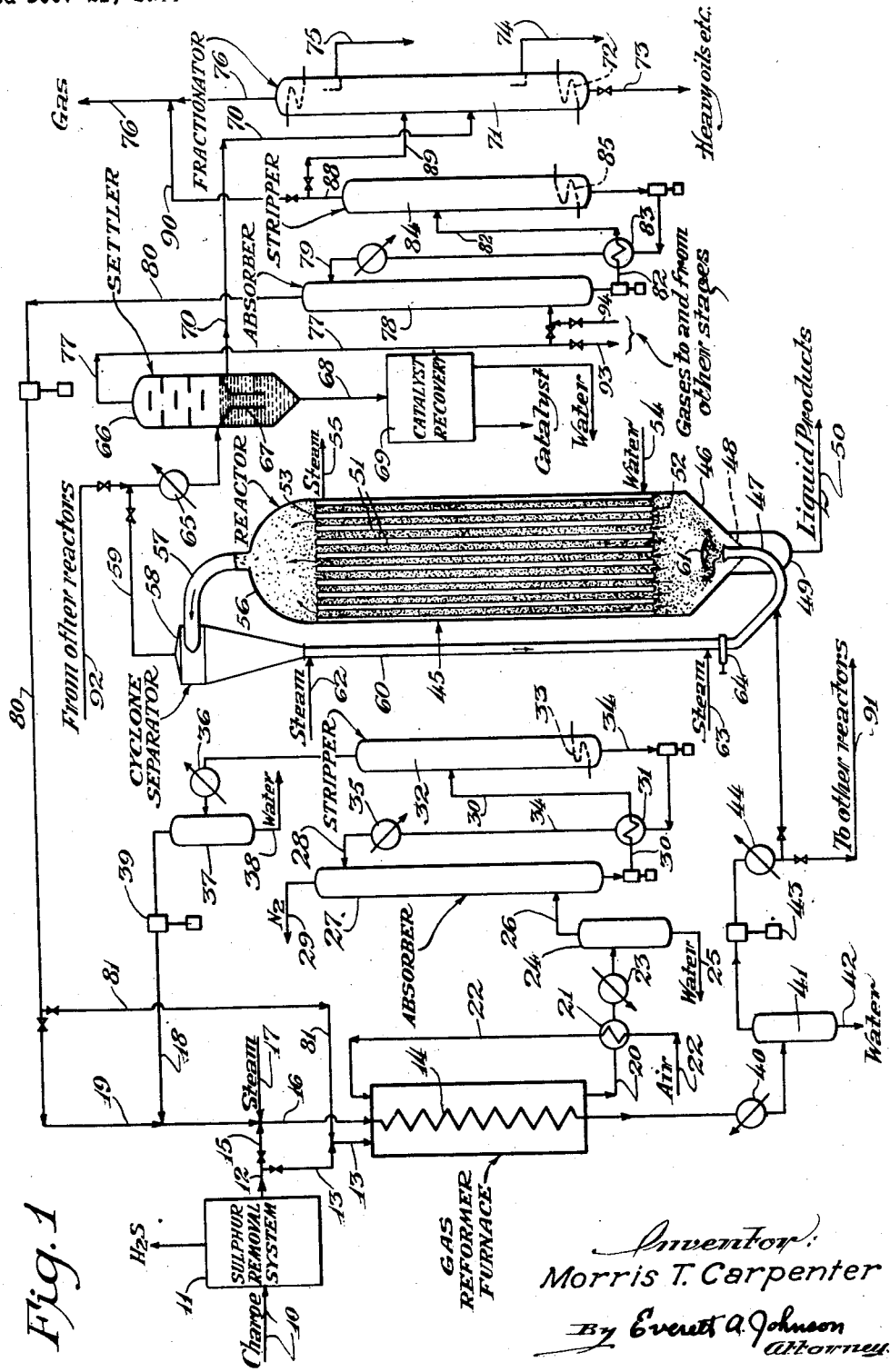

2,500,516

UNITED STATES PATENT OFFICE 2,500,516

HYDROCARBON SYNTHESIS

Morris T. Carpenter, Flossmoor, Ill., assignor to Standard Oil Company, Chicago, Ill., a corporation of Indiana Application December 21, 1944, Serial No. 569,237

2 Claims. (Cl. 260—449.6)

This invention relates to an improved method and means for effecting the synthesis of hydrocarbons from carbon monoxide and hydrogen.

Heretofore a major problem in this synthesis has been that of heat removal and temperature control. The synthesis is exothermic and it has been necessary to have each catalyst particle immediately adjacent a heat exchange surface, i. e., within a few millimeters thereof. Prior synthesis reactions have, therefore, been extremely complicated and expensive and it has been most difficult to obtain access to the inner part of a synthesis reactor for the purpose of repair or for replacing catalyst material. An object of my invention is to provide a system wherein catalyst particles are constantly in turbulent motion so that the catalyst particles do not have to be immediately adjacent a heat exchange surface and so that the heat exchange surfaces in the synthesis zone may consist of simple tubes or of annular spaces between concentric cylinders which are relatively easy and inexpensive to manufacture and repair. A further object is to provide a system wherein the synthesis temperature may be controlled and maintained within very close limits.

A further object of my invention is to provide a system which is flexible in operation so that it may be employed under a wide variety of temperature and pressure conditions for selectively producing hydrocarbons of various boiling ranges.

A further object of the invention is to provide an improved system for converting hydrocarbon gases such as natural gas into normally liquid or normally solid hydrocarbons and to utilize in this system the methane and ethane which is produced in the system itself. A further object is to improve the efficiency and to decrease the expense of a system for obtaining a desired hydrogen-carbon monoxide mixture from normally gaseous hydrocarbons (particularly methane and ethane) and steam. A further object is to provide an improved method and means for purging the system of nitrogen.

In practicing my invention I may employ normally gaseous hydrocarbons from any source whatsoever but I prefer to employ natural gas which consists chiefly of methane since it is extremely difficult to convert this particular gas into high molecular weight hydrocarbons by any other process. The natural gas is first freed from hydrogen sulfide and organic sulfur compounds by scrubbing with a suitable solvent such as monoethanolamine, triethanolamine, or the like, followed, if necessary, by scrubbing with a strong caustic solution. The desulfurized gas is then mixed with such proportions of carbon dioxide and steam as to give a gas mixture having an atomic hydrogen:carbon:oxygen ratio of about 4:1:1.

This mixture is then contacted with a reforming catalyst, preferably an VIIIth group metal oxide which is either unsupported or supported on clay, kieselguhr, silica gel, alumina, etc. Such a catalyst, for instance, may be a mixture of the oxides of nickel, iron and manganese with the proportions 1:1:0.5. The nickel or other VIIIth group metal oxide catalyst may be promoted by oxides of aluminum, magnesium, calcium, uranium, chromium, molybdenum, vanadium, etc.

The space velocity through the gas reforming catalyst should be sufficient to give a contact time of about 1 to 60, preferably about 2 to 20 seconds, the temperature of this operation is preferably 1,400 to 1,650° F., or higher, and the pressure may be about atmospheric to 150 pounds per square inch or higher. This reforming operation converts the methane-carbon dioxide-steam mixture into a gas consisting chiefly of hydrogen and carbon monoxide in the proportions 2:1. A mixture of hydrogen and carbon dioxide in the ratio of between about 1:1 and 2:1 can be prepared, for example by the use of a tubular reformer followed by combustion with oxygen. These gas mixtures will be hereinafter referred to as "synthesis" gas or "make" gas.

A considerable amount of heat must be supplied for the gas reforming operation. This heat is preferably produced by burning a part of the desulfurized gas admixed with a part of recycled gas from the system. A considerable amount of the heat contained in the flue gas from the gas reformer burner may be used for preheating air which is to be charged to the burner. Water is then separated from the cooled flue gas and the flue gas is scrubbed with suitable solvent such as monoethanolamine for absorbing carbon dioxide therefrom. The unabsorbed nitrogen is rejected from the system. The carbon dioxide is recovered and employed along with desulfurized gas and steam for the production of synthesis gas as hereinabove described.

My synthesis reactor is preferably a vertical tower filled with vertical tubes about 2 to 12 inches or more in diameter, the tubes being surrounded by a heat exchange fluid such as water. Instead of employing a bundle of tubes in the tower I may provide concentric cylinders with the annular spaces between said cylinders comprising alternate catalyst spaces and heat exchange fluid spaces, respectively. The catalyst may be retained in the tubes or annular spaces by means of screens at the top and bottom thereof or the catalyst may be permitted to pass upwardly out of the reactor and may then be returned at the base of the reactor with the incoming carbon monoxide hydrogen mixture. Alternatively, the catalyst may be passed through a single elongated conduit surrounded by heat exchange fluid.

The catalyst for the synthesis reaction may be either of the cobalt type or of the iron type. The cobalt type promotes the reaction:

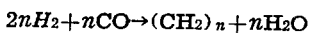

$$2nH_2 + nCO \rightarrow (CH_2)_n + nH_2O$$

and the iron-type catalyst promotes the reaction:

$$3nH_2 + 3nCO \rightarrow 2(CH_2)_n + nH_2O + nCO_2$$

In either case, the catalyst should be in finely divided form so that it can be fluidized by gases flowing upwardly through the body of catalyst at low velocity. The use of catalyst particles of such structure, shape, and size as to be fluidized by up-flowing gases of the above velocities is an important feature of the invention.

The catalyst for the synthesis reaction may be an VIIIth group metal or metal oxide such as nickel or metallic cobalt with or without a suitable carrier such as kieselguhr, Super Filtrol, snythetic silica alumina, silica gel, alumina, etc. One or more promotors or activators which may be the metals or oxides of metals such as copper, manganese, magnesium, thorium, aluminum, vanadium, etc., may be used. Examples of such catalysts are: cobalt and thorium supported on Super Filtrol, nickel, manganese, and aluminum supported on kieselguhr; iron; iron supported on silica or on Super Filtrol; copper and manganese with potassium carbonate as an activator; nickel and copper oxide; supported iron and copper; etc. Ruthenium has been found to be an excellent synthesis catalyst. Alternatively, I may employ iron catalysts of the type used in ammonia synthesis.

When catalyst particles are retained between upper and lower screens, the catalyst particles may be from about 10 mesh to about 200 mesh in size; but when powdered catalyst is employed, the particle size may be as small as 400 mesh or even smaller.

The vertical velocity of the make gas mixture entering the synthesis reactor tubes may be about 0.1 to 20 feet per second, usually about 0.2 to 10 feet per second. The average vertical gas velocity in the reactor, however, will usually be of .05 to 5 feet per second, in most cases about .1 to 2 feet per second and will depend, of course, upon the density, particle size, and character of the particular catalyst which is employed as well as upon desired conversion and reaction conditions, such as temperature, pressure, etc. With catalyst particles of the order of 2 to 200 microns or larger, preferably 20 to 100 microns in particle size and with vertical gas velocity of the order of about .4 to 4.0, preferably between about 1 and about 3, for example, about 1.5 feet per second, a liquid-like dense phase of catalyst is obtained in which the density is between about 30 and about 90%, preferably between about 40 and about 80, e. g., about 60% of the density of the settled catalyst material. The vertical velocity of the reaction gases should in any case be so regulated as to produce a turbulent suspension of catalyst within the reactor. I have found that this turbulent suspension is remarkably uniform in temperature and that heat exchange surfaces may, therefore, be as far apart as a foot or more without losing the critically close temperature control that is required in the synthesis step.

With a cobalt-type catalyst, the temperature of the synthesis step is usually within the range of about 325 to 425° F., the lower temperatures tending toward the production of heavier hydrocarbons such as waxes and the higher temperatures tending toward the production of lighter hydrocarbons such as gases. I prefer to effect the synthesis within a relatively close temperature range of about 325 to 395° F. since maximum liquid yields are obtained at these temperatures with a minimum production of lighter and heavier hydrocarbons.

The temperature of the synthesis step, when employing an iron-type catalyst, usually is within the range of between about 450 and about 675° F., for example, about 550° F. A pressure of between about 5 and about 20 atmospheres or higher may be employed.

Temperature control is effected by carefully regulating the amount and temperature of cooling fluid which surrounds the tubes or annular catalyst spaces. Here water is preferably used as a heat exchange medium and the temperature may be controlled by regulating the level of the water and/or the pressure at which the water vaporizes. Since each particle of catalyst is surrounded by a gas envelope and is in rapid motion in the reactor space there is no possibility of the development of hot spots or overheating. The impingement of catalyst particles on exchanger surfaces tends to keep the exchanger surfaces clean and efficient.

I prefer to employ such reaction conditions as to prevent the condensation of appreciable hydrocarbon liquids in the synthesis zone, but if such liquids are formed, they simply condense on exchanger surfaces and flow down such surfaces to the base of the reactor or suitable trap-out means from which such liquids may be withdrawn in any conventional manner.

The reaction products may be fractionated in any desired manner, but I prefer to employ an absorption system for separating $C_3$ and $C_4$ hydrocarbons from unreacted make gases and methane. The $C_3$ and $C_4$ hydrocarbons are rich in olefins and may be converted by polymerization, alkylation, gas reversion, or other known processes into high quality motor fuels or heavier oils. The stream of separated make gas, which contains considerable amounts of methane and some ethane and ethylene, is preferably split, a part of it being sent to the gas reformer and part to the burner of the gas reformer, the size of the latter stream being sufficiently large to keep the system substantially purged of nitrogen.

The invention will be more clearly understood from the following detailed description read in conjunction with the accompanying drawings which form a part of the specification and in which:

Figure 1 is a schematic flow diagram of an embodiment of my invention;

Figure 2 is a vertical section of a diagrammatic representation of the reactor;

Figure 3 is a vertical section of a preferred reactor and temperature control system; and Figure 4 illustrates the details of one arrangement of the reactor tubes.

In the specific detailed example, I will describe a system for handling about 40,000,000 cubic feet per day of a natural gas which consists essentially of methane. The synthesis will be described in connection with a cobalt-type catalyst. The application of the invention to other charging stock and to plants of various sizes will be apparent to those skilled in the art from the following description.

The charging stock from line 10 is first desulfurized in any conventional system 11. If the gas contains no organic sulfur compounds this desulfurization may be effected in a conventional Girdler process wherein the gas is scrubbed with monoethanolamine or diethanolamine. Hydrogen sulfide may likewise be removed by the Koppers process or by the so-called phosphate process wherein the gas is countercurrently scrubbed in a packed tower with a two mol solution of potassium phosphate. If organic sulfur is present it may be necessary to supplement the extraction process with a concentrated caustic wash. The hydrogen sulfide content should be reduced to at least about .001 grain per cubic foot and this desulfurization may be effected in any konwn manner. The desulfurization step per se forms no part of the present invention, and it will not be described in further detail.

The stream of desulfurized material from treating system 11 is split, about 11,000,000 cubic feet per day being introduced through lines 12 and 13 to the burner for heating gas reformer coils or chambers 14, and the remaining 29,000,000 cubic feet per day being passed through lines 15 and 16 for passage through said reformer coils or chambers 14 together with steam introduced through line 17, carbon dioxide introduced through line 18 and recycled gas introduced through line 19. The daily charge to the reformer coils may be substantially as follows:

| | Cubic feet per day |
|---|---|
| Methane from line 15 | 29,000,000 |
| Carbon dioxide | 9,000,000 |
| Steam | 25,000,000 |
| Recycle gas | 40,000,000 |

This gas mixture is passed through a catalyst chamber or coil 14 at a pressure of about atmospheric to 150 pounds per square inch or more, for example, at about 15 pounds per square inch and at a temperature of about 1400 to 1650° F., for example about 1500 to 1550° F. with such space velocity as to give a contact time of about 2 to 60, preferably about 10 to 30 seconds.

As stated above, the catalyst for this conversion step is preferably one or more VIIIth group metal oxides, preferably nickel or iron or a mixture of nickel oxide and iron oxide. The catalyst may be promoted by other metal oxides, such as aluminum, magnesium, manganese, calcium, uranium, chromium, molybdenum, vanadium, etc., and it may be supported on any suitable support such as clay, kieselguhr, silica gel, alumina, etc. A catalyst, for example, may be a mixture of the oxides of nickel, iron and manganese with the metals in the proportion 1:1:0.5. No invention is claimed in the catalyst per se and since such catalysts are well known in the art, further detailed description is unnecessary.

The heat required for the gas reforming step is about 635,000,000 B. t. u. per hour. A considerable amount of heat from the flue gases leaving the gas reformer furnace through line 20 may be utilized for preheating air in heat exchanger 21, the air being introduced by line 22 to support combustion in the gas reformer furnace. Flue gases which have been partially cooled in heat exchanger 21 may be further cooled in cooler 23 to a temperature sufficiently low to permit condensation of water which may be separated from the cooled flue gases in trap 24 and withdrawn through line 25. The remaining gas mixture may be introduced through line 26 into the base of absorption tower 27 wherein it is scrubbed with cool monoethanolamine or other suitable scrubbing liquid introduced through line 28. The nitrogen is not absorbed in the scrubbing liquid and is removed from the top of the tower through line 29.

The rich scrubbing liquid containing carbon dioxide is pumped through line 30 and heat exchanger 31 to the top of stripping tower 32 which is provided with heating means 33 at its base. Lean scrubbing liquid is withdrawn from the base of the tower through line 34 and pumped through heat exchanger 31 and cooler 35 back to the top of absorber tower 27.

The carbon dioxide removed from the top of tower 32 may be cooled in heat exchanger 36 and passed through trap 37 from which any condensed water may be withdrawn through line 38. The gas from the top of trap 37 passes through compressor 39 to line 18 for the preparation of make gas charge to the gas reformer.

The basic equations for the gas reforming operation may be somewhat as follows:

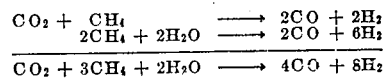

The cycle gas, of course, contains ethane and ethylene as well as methane and unreacted make gas, but the reaction of these hydrocarbons is similar to that hereinabove indicated. The proportions of carbon dioxide and steam may in any case be so adjusted as to give a make gas of between about 2 parts hydrogen to 1 part carbon monoxide and one part hydrogen to one part carbon monoxide.

The hot make gas is cooled in cooler 40 to about room temperature and passed through trap 41 from which condensed water may be withdrawn through line 42. The gases are then passed by compressor 43 through heater 44 to the base of synthesis reactor 45. In the example hereinabove stated, about 130,000,000 cubic feet per day or about 5,400,000 cubic feet per hour or about 90,000 cubic feet per minute of make gas is thus charged to the synthesis reactor or reactors.

The catalyst for the synthesis step may be metallic iron, cobalt, or nickel, either alone or on a suitable carrier such as kieselguhr, silica gel, alumina, etc., with one or more promoting oxides such as oxides of magnesium, thorium, manganese, aluminum, copper, etc.; for instance, about one part by weight of cobalt may be supported on about two parts by weight of kieselguhr and promoted with a small amount of thorium oxide or magnesium oxide or with a mixture of thorium and magnesium oxides. The catalyst may comprise metallic iron, superimposed on Super Filtrol, or a mixture of metallic iron and copper supported on a carrier of the general type disclosed, or a mixture of metallic nickel which has been heated with copper oxides. Ruthenium has been found to be an excellent synthesis catalyst. The catalysts per se for effecting the synthesis reaction are well known in the art and are described in numerous patents and publications and since no invention is claimed in the catalyst per se a further description of catalyst composition is unnecessary.

It should be pointed out that in accordance with the present invention, the catalyst should preferably be rather finely divided and of fairly uniform particle size. I prefer to employ catalysts having a particle size of from about 200 to 400 mesh or smaller, but it should be understood that larger catalyst particle size may be used if gas velocities, reactor designs, etc., are correspondingly modified.

My synthesis reactor preferably consists of one or more vertical towers which may range from about 10 to 50 feet or more in diameter and from about 20 to 50 feet or more in height. The base of the reactor is preferably provided with an inclined conical hopper or funnel-shaped bottom 46 with a slope of about 60 degrees or more so that there will be no tendency for the catalyst to settle out when the make gases are introduced at the base of this funnel-shaped reactor bottom through conduit 47. Distributing means such as baffles, screens, nozzles, and the like, may be provided at the base of the reactor for insuring the uniform distribution of make gases throughout the reactor chamber and for preventing the catalyst from dropping out of suspension.

A screen 48 may constitute the lower portion of the reactor bottom immediately adjacent gas inlet 47 and a sump 49 may be placed under the screen for collecting any waxy-oil drips which may accumulate during the reaction. Normally liquid products together with any catalyst fines passing through screen 48 are withdrawn through line 50 to suitable catalyst recovery and fractionation means.

In the example shown in the drawings, the main body of the reactor is formed of a bundle of tubes 51 between lower tube sheet 52 and upper tube sheet 53. These tubes may be from about 2 inches to 12 inches or more in diameter and they are surrounded by water introduced through line 54. The heat of the reaction converts the water to steam which is withdrawn through line 55. Above the tube section, I may provide an enlarged settling section 56. Auxiliary separation means such as screens or filters, cyclone separators, electrostatic precipitators or the like may be employed in the upper part of the settling section. Alternatively the gases and vapors may be withdrawn from the top of the settling section through line 57 to an external cyclone separator or other catalyst separation means 58. The gases and vapors which are withdrawn from separator 58 through line 59 are substantially free from catalyst material.

The base of the separator 58 may constitute a catalyst hopper which communicates with standpipe 60 leading to inlet pipe 47. Catalyst may be suspended in make gas at the base of standpipe 60 and this suspension of catalyst may be introduced through inlet 47, this means being employed particularly during the starting up period for filling the reactor tubes with suspended catalyst.

In order to prevent chimneying and to obtain turbulence and equal distribution of the catalyst and vapors in funnel-shaped bottom 46, I may employ suitable nozzles, screens, or baffles diagrammatically represented by element 61. When the bulk density of settled catalyst is about 10 to 40 pounds per cubic foot, the rate of introducing synthesis gas should be such that the vertical gas velocity at the lower ends of the tubes 51 is about .2 to 10 feet per second, preferably about .5 to 5 feet per second. In the reactor there will be a material contraction in gas volume. For example, if we have

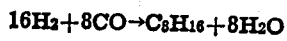

$$16H_2 + 8CO \rightarrow C_8H_{16} + 8H_2O$$

there will be a contraction from 24 volumes to 9 volumes. The volume of gases and vapors leaving the top of tubes 51 may, therefore, be only about ⅓ that entering the tubes, or in other words, the average vertical vapor velocity in the tubes may be only about .05 to 5 feet, preferably about .1 to 2 feet per second.

While fresh catalyst is being introduced and during the first few hours on-stream, there is no appreciable amount of conversion so that the tubes may be substantially filled with suspended catalyst before the actual conversion begins. During this period of charging catalyst into the reactor, the synthesis gas velocity may be somewhat lower than that employed in on-stream reaction because there is no decrease in gas volume in the reactor space.

After the reactor has been on-stream at a temperature of about 325° F. for a period which may range from less than an hour to upwards of 24 hours, the reaction will begin. At this time, the tubes 51 will be substantially filled with suspended catalyst and the high synthesis gas velocity at the lower part of funnel-shaped bottom 46 will hold this suspended catalyst in the tubes or at least adjacent the lower end of tube sheet 52. The temperature of the reaction is maintained within remarkably narrow limits because the turbulence of the suspended catalyst impinging upon heat exchange surfaces and then impinging upon other catalyst particles insures uniform temperature throughout the entire reaction zone. The decrease in gas volume in the upper part of the tubes causes the catalyst to settle back into the denser reaction phase and only a very small amount of catalyst leaves the top of settling chamber 56 for recovery and recycling. In other words, the high gas velocity at the bottom of the reactor keeps the catalyst particles from falling materially below the heat exchange surfaces and the low gas velocity in settling zone 56 permits the catalyst to settle back into the heat exchange zone.

By maintaining fairly high reaction temperatures, i. e., about 350 to 425° F., preferably about 370 to 395° F., with the cobalt-thoria catalyst on kieselguhr, under substantially atmospheric pressure, i. e., about atmospheric to 15 pounds per square inch, I may minimize the amount of heavy hydrocarbons which are formed and produce a maximum of light liquid hydrocarbons. I prefer to operate under such conditions that these light liquid hydrocarbons are carried overhead as vapors without substantial condensation of liquid in the reaction zone. Any liquid which does accumulate in the system, however, may flow down the tube walls to the base of the reactor through screen 48 and may be removed from sump 49 through line 50.

Instead of operating under such conditions that the catalyst is substantially all retained within tubes 51, I may employ higher velocities and continuously remove large quantities of catalyst to separator 58 (in which case, it may be desirable to avoid the use of the enlarged settling zone 56, i. e., to extend the heat exchange surfaces to substantially the top of the reactor). The separated catalyst in the hopper of separator 58 may be stripped with steam or hydrogen introduced through line 62 before it is discharged into standpipe 60. The catalyst in this standpipe may be maintained in fluent form by a gas such as steam introduced through line 63. A suitable slide valve or star feeder 64 may regulate the amount of catalyst which is reintroduced from the standpipe into the base of the reactor.

By stripping the catalyst with steam I may prevent the accumulation of oily or waxy liquids in the catalyst. The steam stripping may be at high temperature and the catalyst may be cooled to the desired operating temperature such as 370 to 395° F. before it is reintroduced into the reactor. Where this particular system is employed it may be necessary or desirable to employ cooling coils in funnel-shaped bottom 46 to avoid the development of high temperatures before the suspended particles of catalyst reach the bottom of tubes 51.

Instead of employing a bundle of tubes in reactor 45 as hereinabove described it should be understood that I may employ a plurality of concentric cylinders in which the alternate annular spaces are filled with suspended catalyst and heat exchange fluid (water) respectively. Here again it is not essential that the heat exchange surfaces be close together since the turbulence of the suspended catalyst insures close temperature control.

I may employ screens or grates at the top and bottom of tubes 51 or the corresponding annular spaces for retaining the catalyst entirely within the heat exchanger section of the reactor. In this case, I prefer to employ a catalyst particle size of about 200 to 10 mesh or larger and to employ such vertical gas velocities as to suspend the catalyst and cause it to assume the dancing turbulence for insuring the necessary uniformity of temperature.

While I have described preferred embodiments of my improved reactor, it should be understood that many other modifications thereof will be apparent to those skilled in the art from the above description. I may, for example simply introduce catalyst into a make gas stream and pass it through an elongated jacketed conduit, separate gases and reaction products from catalyst at the end of the conduit and recycle said separated catalyst with further amounts of make gas. Higher make gas velocities may be employed in such a conduit than are usually employed in the up-flow dense phase reactors of the type heretofore described.

The time of contact between make gas and catalyst may vary from about 2 to 60 or more seconds, but it is preferably within the range of about 20 to 25 seconds. The contact time will depend, of course, upon the activity of the catalyst and the reaction conditions employed.

The pressure for the synthesis reaction when employing cobalt-type catalyst may range from atmospheric to about 150 pounds per square inch or higher. For the preparation of light liquid products, I prefer to employ pressures of about atmospheric to about 50 pounds per square inch, preferably about 10 to 15 pounds per square inch. For the production of heavier hydrocarbons and waxes, I prefer to use lower temperatures and higher pressures. At 150 pounds per square inch, the resulting products are more paraffinic as well as being of higher molecular weight.

The unreacted make gas and product vapors are passed through line 59 to cooler 65 and then introduced into settling chamber 66 for separating condensed water and oil from uncondensed gases. This separator may be any conventional design, but I prefer to employ a funnel-shaped baffle 67 to prevent the incoming stream from disturbing the quiescence of the settling liquids and I prefer to employ a plurality of baffles or entrainment arrestors in the upper part of the settler to insure the removal of liquids from gases.

The settled water, together with any catalyst particles not removed by separator 58, is withdrawn through line 68 to a catalyst recovery system 69. The catalyst particles may be filtered or sedimented from the water and the water may be used for generating steam for use in the system.

The oil may be withdrawn through line 70 to a product fractionation system diagrammatically represented by column 71 having heating coils 72 in the base thereof. Heavy products and waxes may be withdrawn from the base of the column through line 73, heavy oils through lower side stream 74, light oils through side stream 75, and gases chiefly $C_3$ and $C_4$ hydrocarbons through line 76. It should be understood that in actual practice a plurality of fractionating columns would probably be employed and provided with necessary heating and reflux means. Since the fractionation system per se forms no part of the present invention, it will not be described in further detail.

Gases leave the top of separator 66 through line 77 and are introduced at the base of absorber tower 78. An absorber oil such as light naphtha, heavy naphtha, gas oil or the like may be introduced at the top of tower 78 through line 79. $C_3$ and $C_4$ hydrocarbons, together with a part of the ethane and ethylene are thus absorbed from the gases so that gases leaving the top of tower 78 through line 80 contain chiefly hydrogen, carbon monoxide, and methane, together with smaller amounts of ethane, ethylene, and carbon dioxide.

If nitrogen is not entirely removed from the carbon dioxide in tower 27, it would tend to accumulate and build up in the system if the gases from line 80 were all recycled to gas reformer coils 14 for the preparation of further make gas. I, therefore, prefer to pass only about 75% of this cycle gas through line 19 to reactor coil 14 and I pass the rest of this gas through line 81 to line 13 for burning in the gas reformer furnace. The amount of cycle gas which is charged to the furnace may be varied within fairly wide limits but a sufficient amount should be burned to keep the system purged from excess nitrogen.

Rich absorber oil from the base of tower 78 is pumped through line 82 and heat exchanger 83 to the top of stripper tower 84 which is provided with a heater 85 at its base. The stripped gases are withdrawn from the top of tower 84 through line 88. If these gases contain gasoline components this stream may be introduced through line 89 and to fractionating system 71. Otherwise it may be passed through line 90 to gas line 76.

Other reactor systems are contemplated for use in place of the reactor shown in Figure 1. In the examples shown in Figures 2 and 3, the main body of the reactor is formed of a bundle of tubes 51 between lower tube sheet 52 and upper tube sheet 53. These tubes may be from about 2 inches to 12 inches or more in diameter and are surrounded by water introduced through line 54. The heat of the reaction converts the water to steam which is withdrawn through line 55. Above the tube section, I may provide an enlarged settling section 56. Auxiliary separation means such as screens or filters, cyclone separators, electrostatic precipitators, or the like, diagrammatically represented by 100 in Figure 2, may be employed in the upper part of the settling section 56. Distributing means such as baffles, screens, nozzles, and the like, may be employed at the base of the reactor for insuring the uniform distribution of make gases throughout the reactor chamber and for preventing the catalyst from dropping out of suspension. Such means is diagrammatically illustrated at 61 in Figure 2.

The tubes 51 will be substantially filled with suspended catalyst and the synthesis gas velocity within the tubes is controlled as taught hereinabove to maintain the dense turbulent catalyst phase therein. The temperature of the reaction is maintained within remarkably narrow limits because the turbulent suspended catalyst impinges upon heat exchange surfaces and then impinges upon other catalyst particles insuring uniform temperature throughout the entire reaction zone. The decrease in gas volume in the upper part of the tubes causes the catalyst to settle back into the denser reaction phase and only a minor amount of catalyst tends to leave the top of settling chamber 56. In other words, the gas velocity at the bottom of the reactor tubes keeps the catalyst particles from falling materially below the heat exchange surfaces, and the low gas velocity in settling zone 56 permits the catalyst to settle back into the heat exchange zone.

In order to prevent chimneying and to maintain turbulence and equal distribution of the catalyst and vapors within the reactor, I may employ suitable nozzles, screens, porous plug, or baffles diagrammatically represented by element 61 in Figure 2. I may employ individual screens or grates 101 at the top and bottom of tubes 51 or the corresponding annular spaces for supporting the catalyst within the heat exchanger sections of the reactor. Such a porous plug is incorporated in the embodiment illustrated in Figures 3 and 4.

Instead of employing a bundle of tubes in reactor 45 as hereinabove described, it should be understood that I may employ a plurality of concentric cylinders in which the alternate annular spaces are filled with suspended catalyst and heat exchange fluid (water) respectively. Here again, it is not essential that the heat exchange surfaces be close together since the turbulence of the suspended catalyst insures close temperature control. Temperature control is effected by carefully regulating the amount and temperature of cooling fluid which surrounds the tubes or annular catalyst spaces. Here water is preferably used as a heat exchange medium, and the temperature may be controlled by regulating the level of the water and/or the pressure at which the water vaporizes. This is illustrated in Figure 3 wherein water is supplied by line 54 to the space 110 between the tubes 51, tube sheets 52 and 53, and the vessel wall 45. The water level and pressure within 110 control the reaction temperature. Steam is withdrawn by line 55 and the pressure can be regulated by valve 107. The steam is introduced into exchanger 106 and withdrawn by line 109 at for example 750 p. s. i. Water is supplied by line 108 and may be process water. Since each particle of catalyst is surrounded by a gas envelope and is in rapid motion in the reactor space, there is no possibility of the development of hot spots or overheating. The impingement of catalyst particles on exchanger surfaces 51 tends to keep the exchange surfaces clean and efficient.

In Figure 3 the catalyst recovery is effected by a plurality of ceramic filters 102. The space above the filters 102 is partitioned by one or more baffles 103 to provide a plurality of sections communicating with groups of the Aloxite filters. By controlling valved lines 104—105, selected units of the catalyst filters 102 are blown back with purge gas, for example, steam or tail gas from the hydrocarbon recovery system, to set the catalyst free in 56. Catalyst-free reaction products are withdrawn by line 57 and passed to the recovery system via line 59 of Figure 1. However, when using the reactor of Figures 2 and 3, catalyst recovery means 69 and 58 ordinarily will not be necessary.

The gases produced from the process, particularly the $C_3$ and $C_4$ hydrocarbons, are highly olefinic and are excellent charging stocks for polymerization, alkylation, or gas reversion. They may be converted into high antiknock motor fuels by alkylation with isobutane in the presence of sulfuric acid or aluminum chloride complexes. They may be polymerized to high quality motor fuels either thermally or by use of a phosphoric acid catalyst, a copper pyrophosphate catalyst, a sulfuric acid catalyst or any other known polymerization catalyst. They may be converted into viscous synthetic oils of high molecular weight by polymerization with aluminum chloride, boron fluoride, or other Friedel-Crafts catalysts.

The knock rating of the gasoline fraction may be increased by catalytic reforming in the presence of catalyst of the silica alumina type or by catalytic reforming in the presence of aromatizing catalysts such as chromium oxide or molybdenum oxide supported on alumina. In this latter process the vaporized naphtha fraction may be contacted at a temperature of about 850 to 1050° F. usually about 925 to 950° F. at a pressure of about 50 to 600 pounds per square inch, preferably about 200 to 300 pounds per square inch at a space velocity of about .2 to 2 volumes of liquid feed per volume of catalyst space per hour, preferably 0.5 to 1.0 v./v./hr. with an on-stream time of about 1 to 12 hours, preferably about 6 hours. In this so-called dehydroaromatization process, I prefer to employ about 1000 to 5000, preferably about 2500 cubic feet of hydrogen-containing recycle gas from the dehydroaromatization system per barrel of stock charged. This catalytic reforming or dehydroaromatization of the synthesis gasoline produces large yields of isomerized and aromatized hydrocarbons of very high knock rating.

The gas oil synthesis fraction may be subjected to catalytic or thermal cracking or to catalytic or thermal gas reversion. The waxes are valuable products per se but they likewise form excellent charging stocks for catalytic cracking, catalytic gas reversion, or destructive hydrogenation.

All of the products are valuable for chemical synthesis reactions because they are aliphatic and not associated with naphthenic and aromatic hydrocarbons found in natural petroleum.

While I have described a single reactor, it should be understood that I may employ a plurality of reactors in parallel. A single reactor might have to be as much as 50 feet in diameter in a plant of the size hereinabove described and it may, therefore, be desirable to employ 10 reactors in parallel each of about 15 feet in diameter. Each of the reactors may be of similar design and I have, therefore, indicated the parallel flow in the drawings by showing line 91 leading to other reactors and line 92 conveying gases and vapors from other reactors to separator 66. If more than one stage of synthesis is desired, I may pass gases to the second stage through line 93 and return the gases and vapors from the separator or the second stage to the absorption tower through line 94. If a multi-stage system is employed, the product should be separated after each stage with all of the separated water from various stages introduced into recovery system 69 and all other liquid products charged to fractionation system 71.

This application is a continuation-in-part of my copending application, Carpenter, S. N. 390,165, now abandoned.

While I have described in detail certain preferred embodiments of my invention and preferred operating conditions, it should be understood that various other modifications and operation conditions will be apparent to those skilled in the art from the above description. My invention is not limited to the particular details hereinabove set forth but only as they refer to the following claims.

What I claim is:

1. A method of conducting exothermic gas reactions in the presence of solid catalyst of small particle size which method comprises: supporting each of a multiplicity of separately confined vertically extending catalyst masses of small cross-sectional area and sufficient length to provide substantial gas reaction and product gas formation above a gas pervious catalyst barrier; merging a superposed body of the catalyst with the separately confined catalyst masses; flowing uniform streams of reactant gases upwardly through said catalyst supporting barrier and through each of said separately confined masses of catalyst under conversion conditions and at such velocity as to maintain the catalyst masses and superposed catalyst body in a turbulent suspended dense phase; commingling the product gases and catalyst from said separate masses with the superposed body of dense phase turbulent catalyst whereby the catalyst is distributed at random to said masses in the presence of unreactive product gases; flowing product gases at reduced velocity from the upper part of the said superposed body into a catalyst settling zone; releasing the gases from an upper part of said settling zone through a gas pervious catalyst barrier; and maintaining each of the said separately confined catalyst masses in indirect contact with a heat exchange fluid for removing exothermic heat of reaction.

2. A method of conducting exothermic gas reactions in the presence of solid catalyst of small particle size, which method comprises: flowing uniform reactant-gas streams upward through the said catalyst under conversion conditions and at a rate sufficient to maintain the catalyst in turbulent suspended dense phase in an exothermic gas-reaction zone consisting essentially of a plurality of separately confined vertically extending masses of small cross-sectional area and of sufficient length to provide substantial formation of product gases; supporting each of the separate catalyst masses above a gas pervious catalyst barrier close to heat exchange surfaces and in indirect contact with a single body of cooling fluid; commingling product gases and dense phase catalyst in a superposed turbulent dense phase catalyst body merged with said separately confined masses and upflowing gas streams above the exothermic gas-reaction zone, and distributing the catalyst in said body at random to said separate masses that are in the exothermic gas-reaction zone; flowing product gases at reduced velocity from the upper part of the said superposed body into a catalyst-settling zone of effective cross-sectional area greater than the sum of cross-sectional areas of the separately confined masses; and releasing the gases from an upper part of said settling zone through a gas pervious catalyst barrier.

MORRIS T. CARPENTER.

REFERENCES CITED

The following references are of record in the file of this patent:

UNITED STATES PATENTS

| Number | Name | Date |
|---|---|---|
| 1,845,058 | Pier | Feb. 16, 1932 |
| 1,982,099 | Hechenbleickner | Nov. 27, 1934 |
| 1,984,380 | Odell | Dec. 18, 1934 |
| 2,224,049 | Herbert | Dec. 3, 1940 |
| 2,238,766 | Alberts | Apr. 15, 1941 |
| 2,266,161 | Campbell et al. | Dec. 16, 1941 |
| 2,298,593 | Rubin | Oct. 13, 1942 |
| 2,337,684 | Scheineman | Dec. 28, 1943 |
| 2,360,787 | Murphree | Oct. 17, 1944 |